United States Patent [19]
Park

[11] Patent Number: 5,415,036
[45] Date of Patent: May 16, 1995

[54] AUTOMOTIVE MISFIRE CYLINDER IDENTIFICATION SYSTEM

[75] Inventor: Kyong M. Park, Thousand Oaks, Calif.

[73] Assignee: Kavlico Corporation, Moorpark, Calif.

[21] Appl. No.: 188,580

[22] Filed: Jan. 28, 1994

[51] Int. Cl.⁶ .................... G01L 3/26; G01L 5/13; G01M 15/00
[52] U.S. Cl. .................... 73/117.3; 60/227; 364/431.08
[58] Field of Search ............. 73/35, 116, 117.2, 117.3; 60/227; 123/436, 437; 364/431.04, 431.08

[56] References Cited

U.S. PATENT DOCUMENTS

| | | | |
|---|---|---|---|
| 3,965,677 | 6/1976 | Goto et al. | 60/277 |
| 3,983,754 | 10/1976 | Deguchi et al. | 60/277 |
| 4,040,294 | 8/1977 | Matsuda et al. | 60/277 |
| 4,083,234 | 4/1978 | Aono et al. | 73/116 |
| 4,302,814 | 11/1981 | Full et al. | 73/116 |
| 4,388,668 | 6/1983 | Bell et al. | 361/283 |
| 4,892,075 | 1/1990 | Iriyama et al. | 73/117.3 |
| 5,269,178 | 12/1993 | Vigmostad et al. | 73/116 |

*Primary Examiner*—Richard E. Chilcot, Jr.
*Assistant Examiner*—William L. Oen
*Attorney, Agent, or Firm*—Poms, Smith, Lande and Rose

[57] ABSTRACT

An automobile engine has a pressure transducer in its exhaust system, and misfires are identified by the pressure drop accompanying the misfire, and the timing of the pressure drop relative to the cylinder identification signal. This may be accomplished digitally, sampling the pressure level at a rate of 1,000 cycles per second or more, and statistically analyzing the samples representing relative pressure. The sharp pressure drop and the range of pressures are important parameters in identifying the misfiring cylinder.

21 Claims, 4 Drawing Sheets

AUTOMOTIVE MISFIRE CYLINDER IDENTIFICATION SYSTEM

RELATED PATENT APPLICATIONS

This invention is related to the prior U.S. patent Applications Ser. Nos. 08/088,172, filed Jul. 7, 1993, entitled "Pressure Discontinuity Analysis System," and 08/088,163, filed Jul. 7, 1993 and entitled "Misfits Detection in Automobile Engine," with both of the foregoing applications being assigned in whole or in part to the assignee of the present invention.

BACKGROUND OF THE INVENTION

When an automobile engine misfires, it would be desirable to quickly and accurately identify the cylinder which is misfiring, so that repairs or correction of the problem could be quickly accomplished. In the past, various methods have been employed to accomplish this goal. The most common technique is to run the engine at a fairly low speed and successively disable the cylinders, one-by-one, and check for changes in motor sound and/or vibration, with disabling of the misfiring cylinder not causing any change, while the disabling of other cylinders producing further (intentional) misfiring and a change in engine sound or vibration. However, the foregoing method is time consuming; and, with intermittent misfiring conditions, it is difficult to identify the source of the problem.

Accordingly, a principal object of the present invention is to identify the particular cylinder causing misfiring conditions in engines.

SUMMARY OF THE INVENTION

In accordance with the present invention, a pressure-to-electrical signal transducer is employed to sense the exhaust pressure from an internal combustion engine. The timing of significant pressure discontinuities which accompany cylinder misfiring conditions is compared against a standard signal such as a C.I.D. (Cylinder Identification) signal which occurs at an accurate time once for each engine firing cycle; and the timing of the misfire relative to the C.I.D. signal uniquely identifies the misfiring cylinder.

In accordance with a preferred embodiment of the invention, the output from the pressure transducer is sampled at a fairly high rate and converted from analog signals to an extensive set of digital signals or numbers, corresponding to the relative pressure at successive sampling instants, extending over a firing cycle, as measured from one C.I.D. signal to the next, and including the firing times for all engine cylinders. The statistical deviation is calculated to determine whether there is a misfire, and in the event of a misfire, the time of occurrence of the misfire is identified. This time is "normalized" by taking the ratio of the time of occurrence of the misfire and dividing it by the C.I.D. period, or the time interval from one C.I.D. signal to the next. This C.I.D. ratio, or "normalized" time period is then compared with a "Look-Up Table" or Library of C.I.D. ratios each identifying one of the cylinders, the misfiring cylinder is identified, and output signal indicating this result is provided.

One important advantage of the present invention is that intermittent misfires can be identified.

The matter of whether or not a misfire occurs may be determined through statistical analysis, with the magnitude of the statistical deviation in pressure signals indicating whether or not misfires are occurring. One text which describes the techniques employed in statistical analysis which may be employed in a preferred implementation of the invention is "Numerical Recipes in C" or "The Art of Scientific Computing," Second Edition, by William H. Press et al., Cambridge University Press.

As one subordinate aspect of the invention, an oscilloscope, or monitor may be provided to receive both C.I.D. and pressure transducer signals, for determining visually the presence of misfires. The pressure transducer signals may be amplified and applied directly to the oscilloscope, or may be processed as described in the above-identified prior patent applications, and then applied to the oscilloscope.

It is also noted that there is a significant pressure drop at the engine exhaust associated with a misfire. Further, the "range" or the difference between maximum and minimum pressure reachings at the engine exhaust is an important indication of misfire occurrences.

Other objects features and advantages of the invention become apparent from a consideration of the following detailed description and from the accompanying drawings.

DETAILED DESCRIPTION OF PREFERRED EMBODIMENTS

Figure 1:
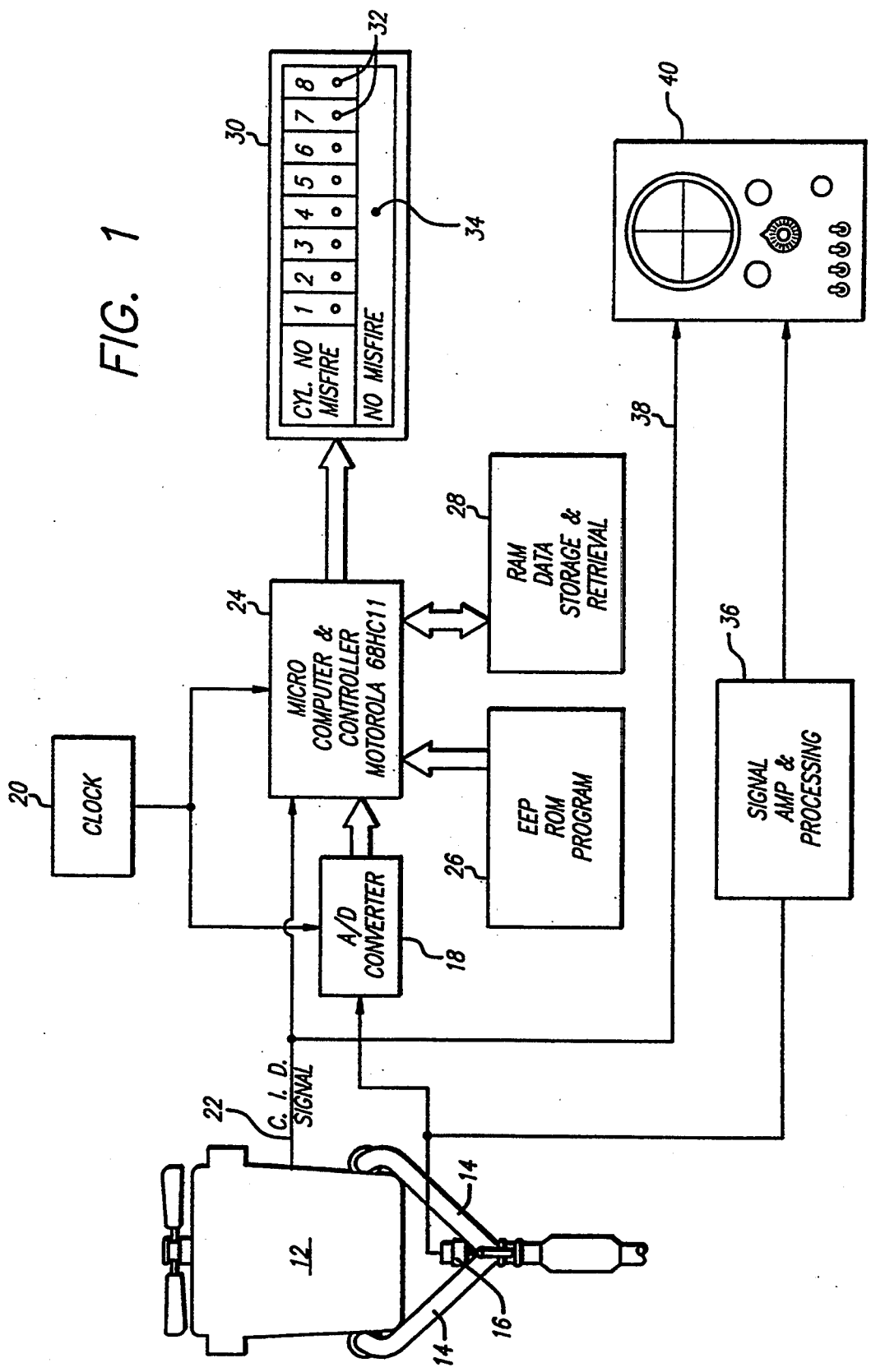
FIG. 1 is a block diagram of an overall system illustrating the principles of the present invention.

Referring more particularly to the drawings, FIG. 1 shows an automobile engine 12 having an exhaust system 14, to which the pressure transducer 16 is coupled.

The pressure transducer may be of the type described for example in U.S. Pat. No. 4,388,668, granted Jun. 14, 1983, and assigned to the Assignee of the present application. The pressure transducer includes two disks of ceramic material, and in one operative embodiment, the disks were approximately 1.27 inches in diameter and the diaphragm was approximately 14.5 thousandths of an inch thick. The two ceramic disks are preferably spaced apart by glass frit by a relatively small distance such as a few thousandths of an inch, and they have spaced conductive plates on their inner surfaces, which form a capacitor. As the diaphragm is flexed with pressure changes, the capacitance of the spaced plates changes. Forming a part of the pressure-to-electrical signal transducer is a small printed circuit board which transforms the changes in capacitance to a varying electrical signal. One typical circuit which is employed for this purpose is disclosed in U.S. Pat. No. 4,398,426, granted Aug. 16, 1983, and assigned to the Assignee of the present invention. These transducers are available from Kavlico Corporation, 14501 Los Angeles Avenue, Moorpark, Calif. 93021, as ten PSIG (Pounds Per Square Inch—Gauge) pressure transducers.

Returning to FIG. 1 of the drawings, the output signal from the transducer 16 is routed to the analog-to-digital converter 18 where it is sampled at a rate, such as 1,000 or 5,000 or more samples per second, under the timing control of the clock 20.

From the engine 12, the cylinder identification signal for (C.I.D.) signal on lead 22 is supplied to the microcomputer and controller 24, along with the output from the analog-to-digital converter 18. The program control for the system is stored in the memory 26. Memory 26 may be, for example, an EPROM or an EEPROM. The additional random access memory 28 is provided to receive and store data being processed by the microcomputer and controller 24, and may store additional information as a "library" or "Look-UP Table." The display unit 30 provides an indication of the misfiring signal by the illumination of one of the red LED signal elements 32. When the green LED 34 is illuminated, this indicates that there are no misfiring cylinders.

The output from the transducer 16 is also supplied to the signal amplification and/or processing circuit 36. The C.I.D. signal is routed on lead 38 to the oscilloscope 40. Similarly, the output from the circuit 36 is applied to the oscilloscope 40.

The electrical signals from the transducer 16 may be merely amplified by the circuit 36 and applied to the oscilloscope 40. With these conditions, the signal appearing on the screen of the oscilloscope 40 be substantially of the form shown in FIG. 2, with minor variations in pressure, as the successive cylinders of an eight cylinder engine fire. On the other hand, in the case of a misfire, the trace will be of the type shown in FIG. 3 of the drawings. More specifically, note the successive minima appearing at points 52, 54 and 56, for example. These minima represent points of reduced pressure which occur when a misfire takes place.

Figure 2:
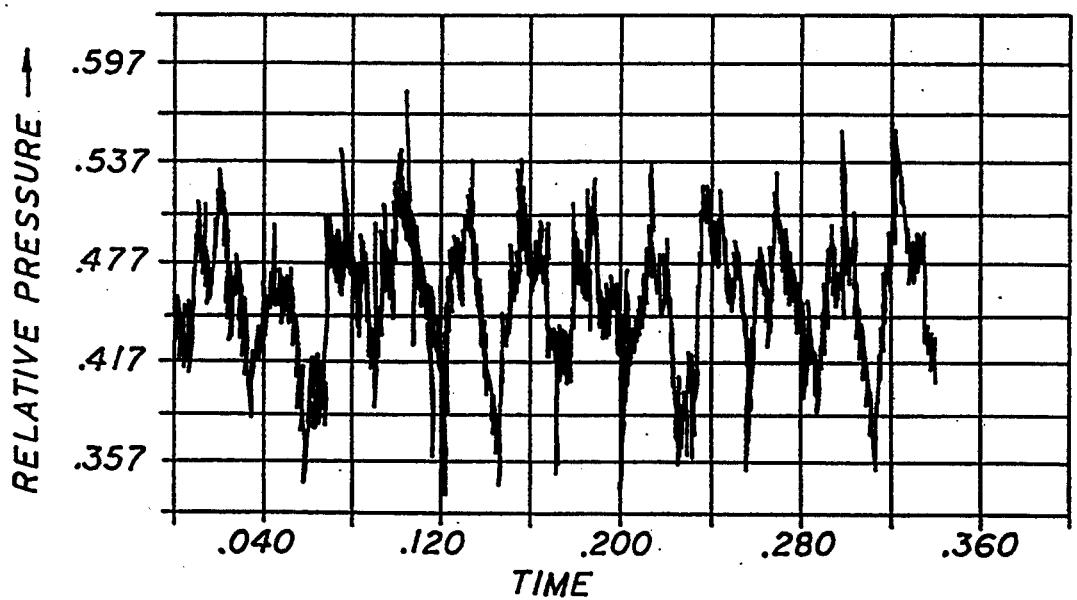
FIG. 2 is a plot of relative pressure against time extending for several engine cylinder firing cycles for a normal eight cylinder engine operating at approximately 1,000 revolutions per minute.
Figure 3:
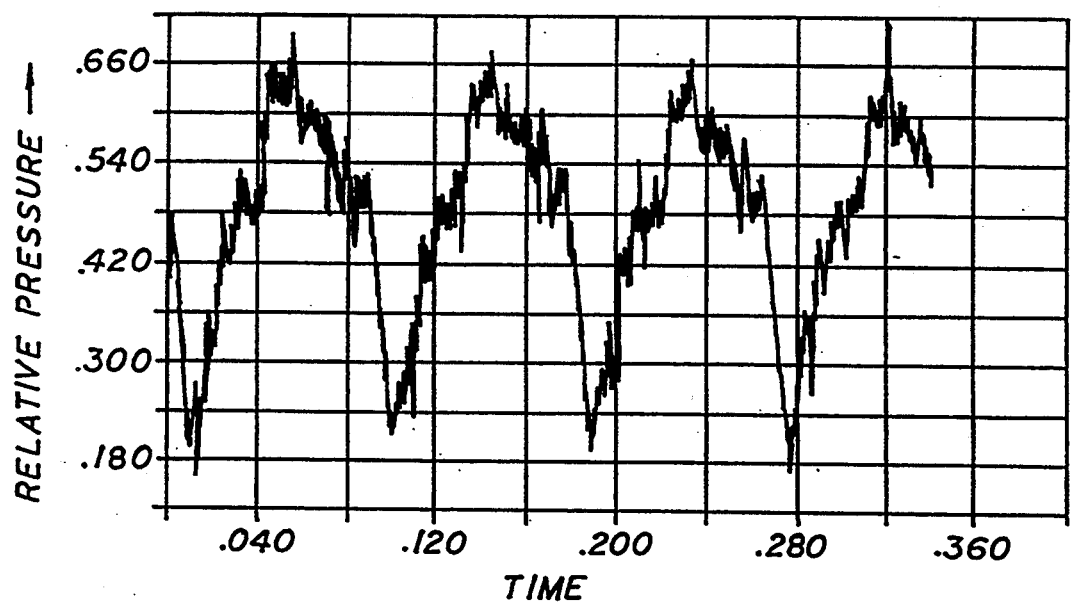
FIG. 3 is a plot of relative pressure against time extending for several cycles of cylinder firing of an engine so operating at approximately 1,000 revolutions per minute, but with one of the cylinders misfiring.

Referring now to the analog-to-digital converter 18, signals of the type shown in FIG. 3 of the drawings are applied to the analog-to-digital 18, and these signals are sampled at a rate sufficiently high to follow the changes in input pressure, perhaps 1,000 to 5,000 or more times per second. Tables 1A and 1B are the result of a typical numerical processing from the analog-to-digital converter 18. The first and third columns of Tables 1A and 1B represent successive time intervals, while the second and fourth represent relative pressure. At the top of the first and second columns is the standard deviation for a normal non-misfiring engine running at 1,000 rpm. In this case, this standard deviation was approximately 0.039. At the top of the third and fourth columns, representing a misfiring engine running at the same revolutions per minute, is the standard deviation of 0.121. Thus, it may be seen that the standard deviation is in the order of three times as great for a misfiring engine, as for a normal non-misfiring engine. Table 1B is a continuation of Table 1A, placed on a separate sheet for convenience in attaching to the patent application. The first two columns of the combined tables generally correspond to the beginning of FIG. 2, while the last two columns correspond to the beginning of FIG. 3. In reviewing the final column of relative pressure values included in Tables 1A and 1B, it may be noted that the relative pressure drops from the initial figure of 0.4979, down to a minimum of 0.1855, about one-third of the way down Table 1B. Thereafter, the relative pressure values start to increase.

It is to be understood that Tables 1A and 1B are merely illustrative of the type of signals which are transmitted by the A-to-D converter 18 to the microcomputer and controller 24. Of course, Tables 1A and 1B are written in decimal formal, while the numerical or digital information transmitted from the A-to-D converter 18 to the microcomputer 24 is in binary form. It is also note that each period for the firing of a complete set of eight cylinders would take many more samples than are shown in Tables 1A and 1B, but these are merely exemplary of a small portion of the start of one cycle.

Figure 4A:
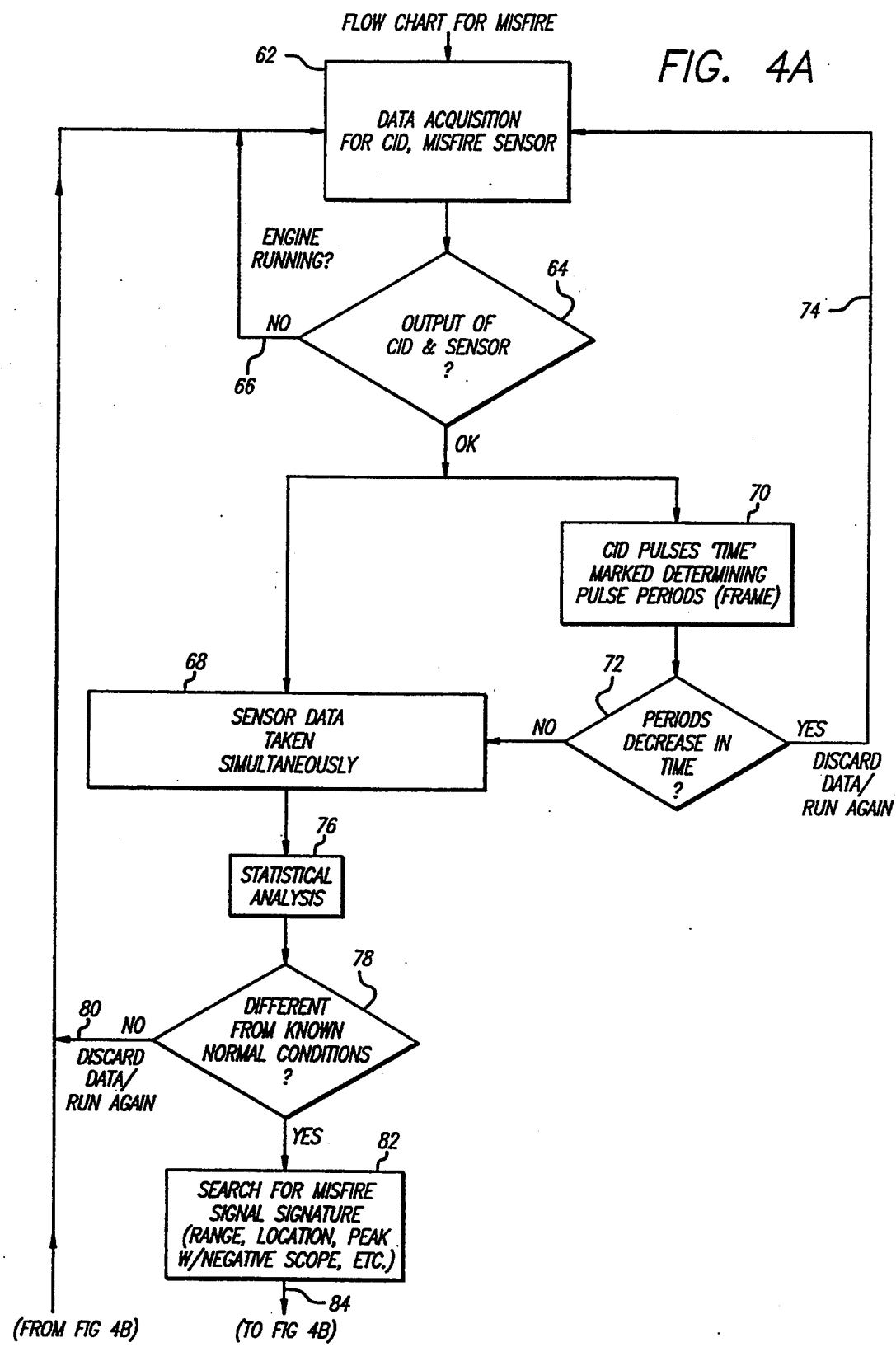
FIGS. 4A and 4B together show the mode of operation of the circuit of FIG. 1, in detecting misfiring cylinders, and identifying them.
Figure 4B:
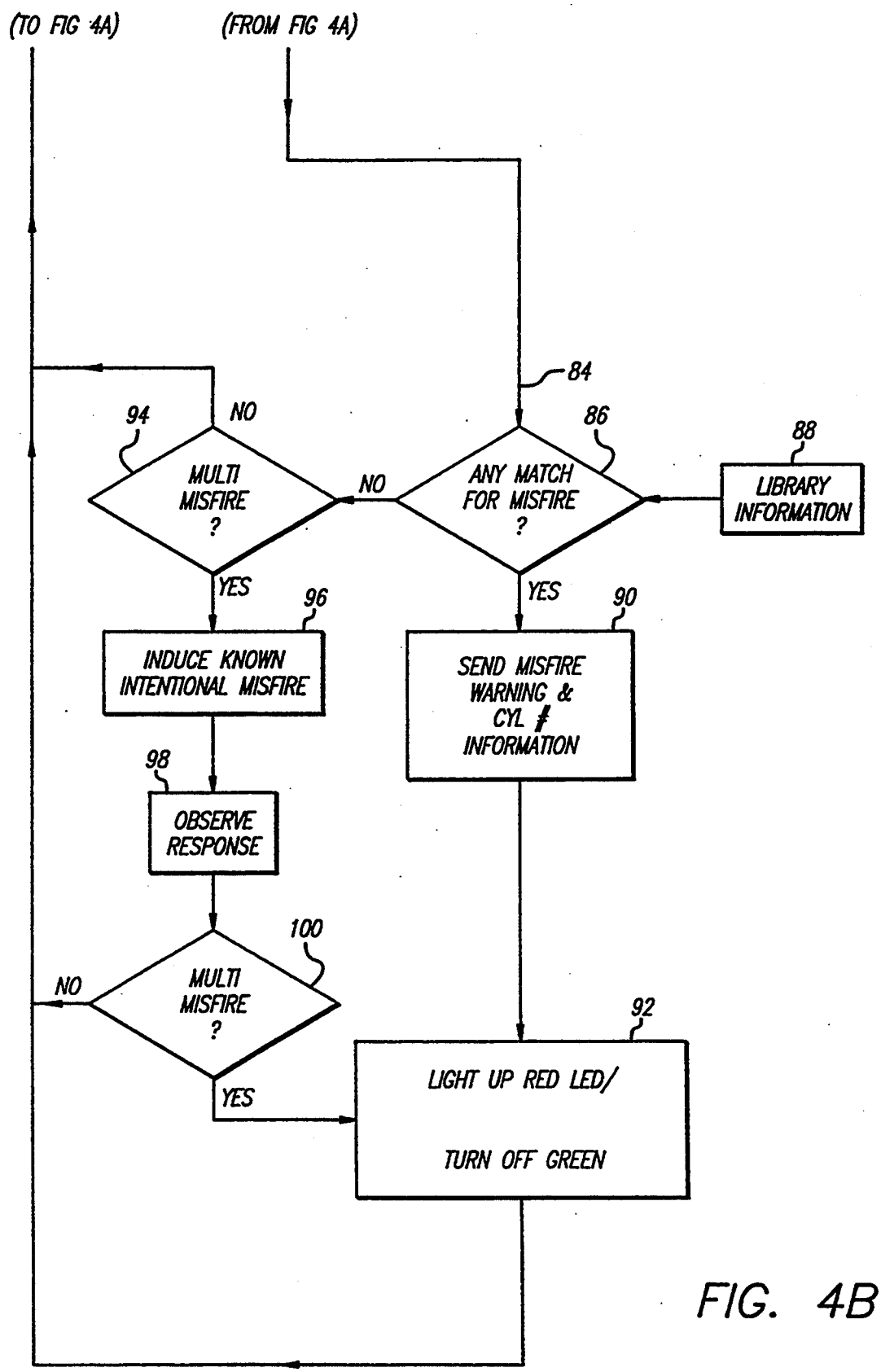

Reference will now be made to FIGS. 4A and 4B which show the sequence of operations of the microcomputer and controller 24, as shown in FIG. 1. Initially, block 62 indicates start-up and the acquisition of data from both the C.I.D. lead 22, and from the pressure transducer 16 and processed by the analog-to-digital converter 18. Diamond 64 inquires as to whether or not these two inputs are present, with an indication producing a recycling of the system along the path indicated by the line 66. If both inputs are present, we proceed to the blocks 68 and 70, indicating the recording of both the C.I.D. signal and also the sensor data. Below block 70 is the diamond 72 indicating the evaluation of successive C.I.D. pulse periods to see if the pulse periods are decreasing in time indicating deceleration of the engine. A "yes" response to this inquiry causes recycling of the system as indicated by line 74, as some misfires are to be expected during deceleration and the system is not intended to track such misfires. An answer to the question raised by diamond 72 indicates that the recording process will continue, as indicated by the line extending to block 68. The next steps of statistical analysis are indicated by the blocks 76 and 78. The statistical analysis is accomplished as discussed in the text citation cited hereinabove, using data of the type set forth in Tables 1A and 1B. The output is of the type indicated in FIG. 2, and as set forth in the second column of Tables 1A and 1B, and these are normal, non misfiring conditions, and the system is recycled as indicated by the line 80. However, if there is a large standard deviation, as is present in the pressure signals of FIG. 3 and the fourth column of Tables 1A and 1B, then a misfire is indicated, and we proceed to block 82 toward the bottom of FIG. 4A. Following analysis as indicated in block 82, line 84 indicates the next step as identified in the diamond 86, determining whether there is "any match for misfire?" One input from block 88 to diamond 86 is the library information, or the "Look-Up Table" for the timing of discontinuities. If a misfire match is found, then we proceed to block 90 indicating energization of signals to control the display 30 of FIG. 1. More specifically, the appropriate red light or LED is turned on to identify the misfiring cylinder, and the green LED light is turned off, as indicated in block 92.

Returning to the diamond 86, if no match is found for a single cylinder misfire, we proceed to diamond 94 which determines whether there is a multi-cylinder misfire. A determination from this statistical analysis leads to recycling of the program back to the starting block 62. A positive response will lead to optional blocks 96 and 98, or directly to block 100. Relative to block 100, a special multi-misfire indication may be provided which would light up all of the red lights or LEDs 32 in the output display 30. Alternately, more detailed examination may be provided inducing known intentional misfires as indicated by the block 96, analyzing the response as indicated by block 98, and identifying the specific multiple misfiring cylinders in the display 30 of FIG. 1.

It is noted in passing that the oscilloscope 40 and the direct or amplified input to the oscilloscope 40 from the pressure transducer 16 may be employed in order to further identify misfires.

It is further noted that, by using the oscilloscope and the circuit 36 along with the direct input 38 to the oscilloscope 40, the oscilloscope may be used directly without the microcomputer 24 to detect misfire. In this connection, the signal amplification and processing circuit 36 may be patterned after those disclosed in the patent applications cited hereinabove to provide a single pulse, occurring at the point of the misfire. This single pulse may be routed to the oscilloscope and may be displayed along with a pair of C.I.D. signals defining a frame. By the location of the misfire pulse between a successive C.I.D. pulses, the misfiring cylinder may be identified. This technique involves the provision of a set of reference time intervals, one for each cylinder, so that the position of the misfire pulse within the C.I.D. period may be associated with the misfiring cylinder.

Referring now back to FIGS. 2 and 3 of the drawings, it may be noted that, with no misfiring, in FIG. 2, the maximum relative pressure is about 0.54 and the minimum is about 0.35, giving a "range" or difference of about 0.19. On the other hand, with the misfiring condition as shown in FIG. 3, the maximum relative pressure reading is about 0.66 and the minimum is about 0.18, giving a much greater range of about 0.48. This very substantial pressure drop, and related greatly increased range is utilized in detecting the existence and timing of the misfire.

In closing, it is to be understood that the foregoing detailed description relates to one preferred embodiment illustrating the principles of the invention. Various modifications may be made without departing from the spirit and scope of the invention. By way of example and not of limitation, the sampling rate for the analog-to-digital converter 18 may vary from approximately 5,000 samples per second up to a million samples per second. Instead of the simple display 30, an alphanumeric display giving results in sentence form may be provided. As noted above, the circuit 36 may be either a direct amplifier, or a signal processing circuit as disclosed in the patent applications cited at the beginning of this specification, and the circuit 36 may be switched from one mode of operation to the other. Concerning the Look-Up Table or library information as indicated at 88 and as stored in the memory associated with the microcomputer 24, the library information may take other forms than a Look-Up Table identifying the ratio as discussed above corresponding to each cylinder. Thus, these ratios may change slightly with different motor speeds, as set forth in revolutions per minute, and tables may be provided for successive speeds, or alternatively the ratios may be modified by a simple algorithm for different speeds. Alternatively, pattern matching or pattern identification may be employed in place of the Look-Up Table, to identify the misfiring cylinder. It is further noted that, in the implementation of the system of FIG. 1, alternative electronic components performing the same functions or equivalent functions may be substituted for the indicated components. Accordingly, the present invention is not limited to the exact configuration as disclosed in the drawings and discussed hereinabove.

Tables 1A and 1B which follow form a part of this patent specification.

TABLE 1A

| Sdev: 0.039328801 Normal @ 1000 rpm | | Sdev: 0.121074943 Misfire @ 1000 rpm | |
| --- | --- | --- | --- |
| time | data | time | data |
| 0.0000 | 0.4491 | 0.0000 | 0.4979 |
| 0.0001 | 0.4442 | 0.0001 | 0.4833 |
| 0.0002 | 0.4393 | 0.0002 | 0.4734 |
| 0.0003 | 0.4393 | 0.0003 | 0.4735 |
| 0.0004 | 0.4491 | 0.0004 | 0.4686 |
| 0.0005 | 0.4491 | 0.0005 | 0.4784 |
| 0.0005 | 0.4491 | 0.0005 | 0.4833 |
| 0.0006 | 0.4540 | 0.0006 | 0.4833 |
| 0.0007 | 0.4540 | 0.0007 | 0.4734 |
| 0.0008 | 0.4638 | 0.0008 | 0.4784 |
| 0.0009 | 0.4491 | 0.0009 | 0.4833 |
| 0.0010 | 0.4442 | 0.0010 | 0.4686 |
| 0.0010 | 0.4491 | 0.0010 | 0.4638 |
| 0.0011 | 0.4393 | 0.0011 | 0.4491 |
| 0.0012 | 0.4393 | 0.0012 | 0.4393 |
| 0.0013 | 0.4296 | 0.0013 | 0.4149 |
| 0.0014 | 0.4393 | 0.0014 | 0.4345 |
| 0.0015 | 0.4491 | 0.0015 | 0.4247 |
| 0.0015 | 0.4442 | 0.0015 | 0.4296 |
| 0.0016 | 0.4491 | 0.0016 | 0.4149 |
| 0.0017 | 0.4393 | 0.0017 | 0.4198 |
| 0.0018 | 0.4442 | 0.0018 | 0.4149 |
| 0.0019 | 0.4442 | 0.0019 | 0.4101 |
| 0.0020 | 0.4296 | 0.0020 | 0.3954 |
| 0.0020 | 0.4345 | 0.0020 | 0.3954 |
| 0.0021 | 0.4296 | 0.0021 | 0.3808 |
| 0.0022 | 0.4296 | 0.0022 | 0.3759 |
| 0.0023 | 0.4247 | 0.0023 | 0.3661 |
| 0.0024 | 0.4198 | 0.0024 | 0.3759 |
| 0.0025 | 0.4345 | 0.0025 | 0.3710 |
| 0.0025 | 0.4393 | 0.0025 | 0.3710 |
| 0.0026 | 0.4393 | 0.0026 | 0.3661 |
| 0.0027 | 0.4442 | 0.0027 | 0.3710 |
| 0.0028 | 0.4540 | 0.0028 | 0.3612 |
| 0.0029 | 0.4540 | 0.0029 | 0.3564 |
| 0.0030 | 0.4393 | 0.0030 | 0.3466 |
| 0.0030 | 0.4345 | 0.0030 | 0.3417 |
| 0.0031 | 0.4345 | 0.0031 | 0.3271 |
| 0.0032 | 0.4296 | 0.0032 | 0.3271 |
| 0.0033 | 0.4296 | 0.0033 | 0.3515 |
| 0.0034 | 0.4101 | 0.0034 | 0.3271 |
| 0.0035 | 0.4345 | 0.0035 | 0.3222 |
| 0.0035 | 0.4296 | 0.0035 | 0.3222 |
| 0.0036 | 0.4393 | 0.0036 | 0.3319 |

TABLE 1B

| 0.0037 | 0.4393 | 0.0037 | 0.3271 |
| --- | --- | --- | --- |
| 0.0038 | 0.4442 | 0.0038 | 0.3173 |
| 0.0039 | 0.4345 | 0.0039 | 0.3075 |
| 0.0040 | 0.4296 | 0.0040 | 0.3027 |
| 0.0040 | 0.4296 | 0.0040 | 0.2800 |
| 0.0041 | 0.4296 | 0.0041 | 0.2880 |
| 0.0042 | 0.4247 | 0.0042 | 0.2880 |
| 0.0043 | 0.4198 | 0.0043 | 0.2880 |
| 0.0044 | 0.4149 | 0.0044 | 0.2831 |
| 0.0045 | 0.4296 | 0.0045 | 0.2831 |
| 0.0045 | 0.4296 | 0.0045 | 0.2831 |
| 0.0046 | 0.4345 | 0.0046 | 0.2783 |
| 0.0047 | 0.4393 | 0.0047 | 0.2587 |
| 0.0048 | 0.4345 | 0.0048 | 0.2636 |
| 0.0049 | 0.4393 | 0.0049 | 0.2587 |
| 0.0050 | 0.4345 | 0.0050 | 0.2441 |
| 0.0050 | 0.4345 | 0.0050 | 0.2441 |
| 0.0051 | 0.4296 | 0.0051 | 0.2392 |
| 0.0052 | 0.4296 | 0.0052 | 0.2441 |
| 0.0053 | 0.4198 | 0.0053 | 0.2392 |
| 0.0054 | 0.4296 | 0.0054 | 0.2343 |
| 0.0055 | 0.4345 | 0.0055 | 0.1855 |
| 0.0055 | 0.4393 | 0.0055 | 0.2441 |
| 0.0056 | 0.4393 | 0.0056 | 0.2441 |
| 0.0057 | 0.4442 | 0.0057 | 0.2294 |
| 0.0058 | 0.4442 | 0.0058 | 0.2246 |
| 0.0059 | 0.4491 | 0.0059 | 0.2441 |
| 0.0060 | 0.4345 | 0.0060 | 0.2246 |

TABLE 1B-continued

| | | | |
|---|---|---|---|
| 0.0060 | 0.4345 | 0.0060 | 0.2246 |
| 0.0061 | 0.4198 | 0.0061 | 0.2294 |
| 0.0062 | 0.4198 | 0.0062 | 0.2294 |
| 0.0063 | 0.4247 | 0.0063 | 0.2246 |
| 0.0064 | 0.4101 | 0.0064 | 0.2294 |
| 0.0065 | 0.4198 | 0.0065 | 0.2343 |
| 0.0065 | 0.4149 | 0.0065 | 0.2392 |
| 0.0066 | 0.4296 | 0.0066 | 0.2246 |
| 0.0067 | 0.4247 | 0.0067 | 0.2197 |
| 0.0068 | 0.4296 | 0.0068 | 0.2099 |
| 0.0069 | 0.4345 | 0.0069 | 0.2148 |
| 0.0070 | 0.4247 | 0.0070 | 0.2148 |
| 0.0070 | 0.4296 | 0.0070 | 0.2148 |
| 0.0071 | 0.4247 | 0.0071 | 0.2099 |
| 0.0072 | 0.4247 | 0.0072 | 0.2148 |
| 0.0073 | 0.4101 | 0.0073 | 0.2294 |
| 0.0074 | 0.4101 | 0.0074 | 0.2294 |
| 0.0075 | 0.4247 | 0.0075 | 0.2294 |
| 0.0075 | 0.4296 | 0.0075 | 0.2197 |
| 0.0076 | 0.4345 | 0.0076 | 0.2197 |
| 0.0077 | 0.4296 | 0.0077 | 0.2148 |
| 0.0078 | 0.4345 | 0.0078 | 0.2197 |
| 0.0079 | 0.4491 | 0.0079 | 0.2197 |
| 0.0080 | 0.4393 | 0.0080 | 0.2197 |
| 0.0080 | 0.4393 | 0.0080 | 0.2246 |
| 0.0081 | 0.4247 | 0.0081 | 0.2294 |
| 0.0082 | 0.4247 | 0.0082 | 0.2143 |
| 0.0083 | 0.4345 | 0.0083 | 0.2441 |
| 0.0084 | 0.4247 | 0.0084 | 0.2490 |
| 0.0085 | 0.4247 | 0.0085 | 0.2441 |
| 0.0085 | 0.4296 | 0.0085 | 0.2343 |
| 0.0086 | 0.4296 | 0.0086 | 0.2392 |

What is claimed is:

1. A method for identifying the cylinder of an automobile engine in which a misfire occurs, wherein the engine provides a cylinder identification (C.I.D.) signal which occurs once each firing cycle of the engine, said method comprising the steps of:

provides a pressure-to-electrical signal transducer to sense the exhaust pressure from the automobile engine;

analyzing the electrical signals from said transducer to identify the occurrence of misfires;

determining the time interval between successive cylinder identification (C.I.D.) signals which is the C.I.D. time period;

providing a computer memory look-up table giving the C.I.D. ratio of (1) the time difference between the C.I.D. signal and the time of firing of each cylinder to (2) the C.I.D. time period;

determining whether a misfire is occurring, by analyzing the transducer output to determine if pressure discontinuities greater than a predetermined level are occurring;

determining the misfire time interval between the C.I.D. signal and the misfire, when a misfire occurs;

calculating the ratio of the misfire time interval to the C.I.D. period to obtain a C.I.D. ratio;

comparing the actual C.I.D. ratio to the memory look-up table of C.I.D. ratios, and identifying the closest entry in the look-up table of C.I.D. ratios to identify the misfiring cylinder; and providing an output signal identifying the misfiring cylinder.

2. A method as defined in claim 1 wherein said method includes the step of analyzing for multiple cylinder misfiring.

3. A method as defined in claim 1 wherein said method includes the step of determining whether the intervals between successive C.I.D. signals have decreased, and blocking the display of misfiring signals when this condition exists.

4. A method as defined in claim 1 including the step of observing signals derived from said transducer and C.I.D. signals concurrently on an oscilloscope.

5. A method for identifying misfiring cylinders of an automobile engine, wherein the engine provides cylinder identification (C.I.D.) signals which occur once each firing cycle of the engine, said method comprising the steps of:

providing a pressure-to-electrical signal transducer to sense an exhaust pressure from the automobile engine and to generate electrical signals;

analyze discontinuities in said electrical signals from said transducer to identify occurrences of misfires;

normalizing a timing of said discontinuities with said C.I.D. signals to generate a C.I.D. ratio;

identifying a misfiring cylinder by comparing said C.I.D. ratio to a library of predetermined C.I.D ratios each identifying one of the cylinders, said library Of C.I.D. ratios being stored in a storage device; and providing an output signal identifying a misfiring cylinder.

6. A method as defined in claim 5, wherein said analyzing step is accomplished digitally using a microcomputer.

7. A method as defined in claim 5 wherein said analysis step is accomplished visually, using an oscilloscope or comparable display of both C.I.D. and output signals derived from the transducer.

8. A system for identifying the cylinder of an internal combustion automobile engine in which a misfire occurs, said engine having an exhaust system, said system comprising;

means for providing a cylinder identification (C.I.D.) signal which occurs once each firing cycle of the engine;

a pressure-to-electrical signal transducer coupled to the exhaust system of the engine to sense the exhaust pressure from the automobile engine;

an analog-to-digital (A/D) converter for converting the analog output signals from said transducer to a series of electrical digital numerical valves of the transducer output signals;

a microcomputer and controller coupled to receive said C.I.D. signal, and the output electrical signals from said A/D converter;

said microcomputer and controller including means for analyzing the electrical signals from said transducer to identify the occurrence of misfires and for determining the interval between successive cylinder identification (C.I.D.) signals which is the C.I.D. time period;

a computer memory coupled to said microcomputer and controller, said memory including a look-up table giving the C.I.D. ratio of (1) the time difference between the C.I.D. signal and the time of firing of each cylinder to (2) the C.I.D. time period;

said microcomputer and controller including:

(a) means for determining whether a misfire is occurring, by analyzing the transducer output to determine if pressure discontinuities greater than a predetermined level are occurring;

(b) means for determining the misfire time interval between the C.I.D. signal and the misfire, when a misfire occurs;

(c) means for calculating the ratio of the misfire time interval to the C.I.D. period to obtain a C.I.D. ratio;

(d) means for comparing the actual C.I.D. ratio to the memory look-up table of C.I.D. ratios, and identifying the closest entry in the look-up table of C.I.D. ratios to identify the misfiring cylinder; and (e) means providing an output signal identifying the misfiring cylinder; and an output display for receiving said output signal and for identifying the misfiring cylinder.

9. A system as defined in claim 8 wherein the system includes a digital memory for controlling the microcomputer and controller.

10. A system as defined in claim 8 wherein the output display includes a plurality of display elements one for indicating a misfiring condition associated with each cylinder.

11. A system as defined in claim 8 further comprising an oscilloscope and circuitry for applying signals derived from said transducer to said oscilloscope.

12. A system for identifying misfiring cylinders of an internal combustion automobile engine, said engine having an exhaust system, said system comprising:

means for providing a cylinder identification (C.I.D.) signal which occurs once each firing cycle of the engine;

a pressure-to-electrical signal transducer coupled to the exhaust system of the engine;

an output display for indicating a misfiring condition of the internal combustion engine; and circuit means coupled to receive said C.I.D. signals and to receive an electrical signal output from said transducer and to supply output signals to said output display, said circuit means including means for identifying a pressure drop representing a misfiring cylinder and for identifying said misfiring cylinder by normalizing a timing of said pressure drop with said C.I.D. signals to generate a C.I.D. ratio and by comparing said C.I.D. ratio to a library of predetermined C.I.D. ratios each identifying one of the cylinders, said library of C.I.D. ratios being stored in a storage device.

13. A system as defined in claim 12 wherein said output display includes are oscilloscope.

14. A system as defined in claim 12 wherein the output display includes a plurality of display elements one for indicating a misfiring condition associated with each cylinder.

15. A system as defined in claim 12 wherein said circuit means includes a microcomputer.

16. A system as defined in claim 12 wherein said circuit means includes an oscilloscope, and means for applying said C.I.D. signals and signals derived from said transducer to said oscilloscope.

17. A system as defined in claim 15 further comprising an analog-to-digital converter for receiving analog signals from said transducer and for supplying output digital signals to said microcomputer.

18. A system as defined in claim 12 wherein said circuit means includes a microprocessor, and wherein an oscilloscope is coupled to received signals derived from said transducer.

19. A system as defined in claim 17 wherein means are provided for operating said A/D converter to take samples at a rate of at least 5,000 samples per second.

20. A system as defined in claim 17 wherein means are provided for operating said A/D converter to take samples at a rate of at least 10,000 samples per second.

21. A system for identifying misfiring cylinders of an internal combustion engine with an exhaust system, the system comprising:

means for providing cylinder identification (C.I.D.) signals which occur once each firing cycle of the engine;

a pressure-to-electrical signal transducer coupled to the exhaust system of the engine;

an output display for indicating a misfiring condition of the internal combustion engine; and circuit means coupled to receive said C.I.D. signals and an electrical signal output from said transducer and to supply output signals to said output display, said circuit means including means for identifying a pressure drop representing a misfiring cylinder and an oscilloscope for identifying said misfiring cylinder by comparing a timing of said pressure drop with said C.I.D. signals.

* * * * *